US006397734B1

United States Patent
Atzinger

(10) Patent No.: US 6,397,734 B1
(45) Date of Patent: Jun. 4, 2002

(54) DEVICE FOR DETECTING THE RAISING STATE OF SMALL PILES OF DOUGH

(76) Inventor: Thomas Atzinger, Kirchheimer Strasse 78, D-73760 Ostfildern (DE)

(*) Notice: Subject to any disclaimer, the term of this patent is extended or adjusted under 35 U.S.C. 154(b) by 0 days.

(21) Appl. No.: 09/720,181

(22) PCT Filed: Jul. 14, 1999

(86) PCT No.: PCT/EP99/04990

§ 371 (c)(1),
(2), (4) Date: Dec. 20, 2000

(87) PCT Pub. No.: WO00/03602

PCT Pub. Date: Jan. 27, 2000

(30) Foreign Application Priority Data

Jul. 15, 1998 (DE) .......................................... 198 31 635

(51) Int. Cl.[7] .............................. A23L 1/00; A21D 8/00; G01N 33/00
(52) U.S. Cl. .............................. 99/468; 99/467; 99/493
(58) Field of Search .......................... 99/467, 468–472, 99/473–479, 483, 484, 485, 486, 325–333, 339, 340, 493; 426/231, 502, 517; 219/506, 400; 200/61.2; 422/310; 250/358.1, 205; 340/617; 361/174

(56) References Cited

U.S. PATENT DOCUMENTS

| 2,147,024 | A | * | 2/1939 | Frisk .......................... 99/468 |
| 3,322,959 | A | * | 5/1967 | Lorenz .................... 340/617 X |
| 5,106,636 | A | * | 4/1992 | Ban et al. .................... 426/231 |

* cited by examiner

Primary Examiner—Timothy F. Simone
(74) Attorney, Agent, or Firm—Pendorf & Cutliff

(57) ABSTRACT

The present invention relates to a device for detecting the raising state of lumps of dough (11) submitted to a fermentation process which is for example induced by yeast in a raising chamber and during which the volume of said lumps increases. The device includes at least one variance detector (21) which is associated with at least one of the lumps of dough placed in the raising chamber, and which generates a characteristic output signal when the thickness of the dough reaches a predetermined target value corresponding to a desired maturation degree of the dough. The variance detector (21) consists of an ultrasonic detector for measuring the propagation time of the ultrasonic signals. The detector is placed on a tripod (17) which can be arranged in the raised chamber (13) on the bottom thereof.

12 Claims, 4 Drawing Sheets

DEVICE FOR DETECTING THE RAISING STATE OF SMALL PILES OF DOUGH

BACKGROUND TO THE INVENTION

1. Field of the Invention

The invention concerns a device for detecting the state of rising of lumps of dough which are subjected to a proofing or fermenting process in a proofing chamber, for example induced by yeast, in the course of which the lumps of dough experience an increase in volume.

2. Description of the Related Art

The typical bakery products such as bread or rolls, which are sold daily in large quantities by branches or retail outlets of bakery factories, in order to be able to represent that they conform to the highest possible levels of freshness and quality, are baked in the respective branch or outlet locations, whereby it is also achieved that the produced amount can be flexibly adapted to the respective demand. Herein, for example, in the production of table rolls, the process begins with lumps of dough, which are pre-produced in a roll producing equipment in large number with substantially identical weight and volume. These lumps of dough, which are already subjected to yeast in their manufacture, are, prior to the rolls can be baked in an oven, subjected to a rising step in a proofing chamber, in which the size and dough consistency required for the baking of the rolls is strived for. Herein the proofing process is so carried out, with respect to the chamber temperature and in certain cases the dwell time, that during a total proofing time of approximately 20 minutes the necessary dough size is achieved, which in typical cases represents the five fold of the volume of the fresh "green" dough lumps produced on the roll producing device before the initiation of the rapidly occurring proofing process is set in motion therein by the elevation of the temperature, after the course of which, that is as soon as the dough lumps have achieved their desired size, these should be baked immediately, in order to achieve table rolls of standardized desired quality. The most important characteristic of quality of the finished baked rolls, which is associated in the mind of consumer with the image of quality, is the size thereof, which should also be uniform among the various types of rolls.

In order to achieve this uniformity, it would seem to be basically suitable to employ constant uniform conditions for carrying out the proofing process, for example using a computer program controlled time-wise control of the proofing chamber temperature, combined with an indication that the proofing time has concluded as determined by the temperature profile. Through such a temperature control it is however not possible to exclude influences on the size of the proofed dough lumps, which result from variations in yeast quality and/or variations in the introduction temperatures of the "green" dough lumps, and which can lead to significant size variations of the proofed dough lumps. It is thus necessary, even when employing a uniform time controlled proofing of the dough lumps, to subject the dough lumps treated in the proofing chamber to a visual quality control before they can be introduced into the baking oven, which however demands a high level of practical experience, in particular in that respect of how in certain cases a proofing process is to be carried out up to suitable ripeness of the dough lumps. The sales persons employed in the branches, which may have only limited knowledge of the baking process, do not as a rule have this particular necessary experience. This has the consequence that often it is only after the table rolls have been baked that it can be recognized whether these satisfy the required quality characteristics.

SUMMARY OF THE INVENTION

It is thus the task of the invention to provide a device of the above described type, which makes possible a reliable, objective measurement of the respective proofing condition of the dough lumps, which correlates to their desired final size.

This task is inventively solved thereby, that a distance sensor operating on a contactless measurement principle is provided in association with at least one of the dough lumps provided in the proofing chamber, which at least then, when the thickness of the dough lump achieves a predetermined desired value, which is associated with the intended condition of proofing of the dough lump, produces a signal which is characteristic therefore.

The inventive device is based on the fact that the volume increase, which the dough lump experiences through the proofing process, seen from its center of gravity, leads to a dimensional enlargement in every direction, so that by measurement of the distance or separation of a surface point or area of the dough lump from the position at which the sensor is situated, a very reliable determination of the volume of the dough lump, or its proofing ripeness condition, is made possible. Starting with an absolute measurement of the starting distance as reference value, and with the progressive measurement of the reduction of this separation, the volume of the dough lump is determinable with sufficient precision, so that from such a distance measurement a sufficiently precise indication with respect to the ripeness of the dough lump can be determined.

By means of the invention the objective determination of the condition of ripeness of the monitored dough lump is made possible in a simple manner, and therewith also that of other dough lumps identical to this dough lump. The inventive device makes possible at the same time an automatic monitoring of the proofing process and in certain cases also permits, depending upon the instantaneously detected volume of the dough lumps, to control the proofing process by influencing the proofing chamber temperature in such a manner, so that the condition of ripeness necessary for the subsequent baking process of the dough lumps is achieved after the expiration of a pre-determined time span. The inventive device is suitable for avoiding inaccurate determinations of the condition of ripeness of the dough lumps and therewith makes possible the rational production of baked wares in a branch or chain operation.

In a preferred design of the inventive device the distance sensor thereof is arranged and oriented in such a manner that it measures the height of the dough lump, in the central area thereof, over the sheet or support, which is useful as a measuring value for the reason that it is determinable in relation to a fixed pre-determined reference value, namely the distance of the support for the dough lumps to the distance sensor, which is pre-determined by the construction specifications of the proofing chamber. Further, the vertical thickness of a dough lump during the proofing process, even in the case that this is smaller than the largest horizontal cross-section, will change a greater amount than measurable by a "horizontal" distance measurement of the horizontal radius of the dough lump, since the vertical thickness change is comprised of the sum of the distance change from the center point of the dough lump to the support plus the change in the vertical separation from the dough lump upper surface to the center point of the dough lump.

A suitable distance sensor to be realized for the inventive device could for example be in the manner of a distance measuring and adjusting system of an auto-focus camera, or an optoelectronic distance measuring device, which however because of the required optical imaging of the target or measurement object is associated with a substantial space requirement, which would be acceptable only in the case of a fixed installation in a chamber with high capacity.

In a preferred design of the inventive device the distance sensor is thus designed as an ultrasonic sensor, which works on the principle of the elapsed travel time measurement of the ultrasonic signal. A distance sensor of this type only requires a small amount of space and can be installed without complication between two support surfaces for dough lumps within a proofing chamber, so that sufficient space for the monitored dough lump still remains below the sensor.

In accordance therewith the distance sensor can be provided on a framework which can be set up on the floor inside a conventional proofing chamber, preferably a three legged framework, and insofar is suitable as a retrofit component for existing proofing cabinets.

As distance sensor a light interruption device is also suitable, in which a light beam is interrupted as soon as at least one of the dough lumps achieves a height that is characteristic for a desired degree of ripeness.

A light interruption device is preferably fixedly installed in the proofing cabinet, wherein the light source and the light detector can be built into the proofing cabinet walls preferably in such a manner, that the light detector is height adjustable, wherein the height adjustability can be realized in simple manner thereby, that the light source is height adjustable and a receiver line is provided fixed in the chamber, comprised of a number of light detectors arranged in small vertical separation from each other, or a single receiver with receiver surface extending in the vertical direction, as well as a gate or aperture which is adjustable in height to a pre-determined distance above the floor which carries the dough lumps.

In a preferred design of such a light detector the detector light beam is so arranged that it crosses over multiple dough lumps, for example a centrally oriented row of dough lumps, whereby even in the case of a minor irregular arrangement of the dough lumps the probability is increased that the light detector is interrupted at the correct point in time, even when the light detector-light beam does not precisely cross over the central plane of some of the individual dough lumps.

In one embodiment of the distance measuring device as a light detector device, it is particularly advantageous when a laser is employed as a light source, which emits a strongly bundled parallel light beam of small cross-section and high light intensity without requirement for specialized optical elements and/or apertures, which in an advantageous embodiment of the invention can be divided by means of a simple beam splitter into multiple partial light beams of preferably approximately the same intensity, which can be utilized for monitoring of dough lumps in multiple planes of a proofing chamber or even for monitoring of dough lumps in multiple proofing chambers, which are positioned in spatially fixed coordinates within a larger proofing facility, in which the employment of a laser can be more economical than an arrangement of light detectors which have respectively one individual light source of simple design.

The reliability of recognition of the interruption of a light interruption device in accordance with a further embodiment of the invention is thereby improved, in that at least one scatter-light detector is provided, preferably in a device above the sensor plane defined by the light interruption device, wherein the scatter-light detector produces a signal, when the light shutter interrupting areas of a dough lump are illuminated by the light interruption device light beam and thereby scatter light, which is easy to construct by means of a simple imaging system uniformly monitoring the dough lumps, and which by using a light detector can be utilized for producing a confirmation signal.

BRIEF DESCRIPTION OF THE DRAWING

Further details of the inventive device can be found in the following description of exemplary embodiments thereof as illustrated by the drawings. There is shown.

DETAILED DESCRIPTION OF THE INVENTION

Figure 1:
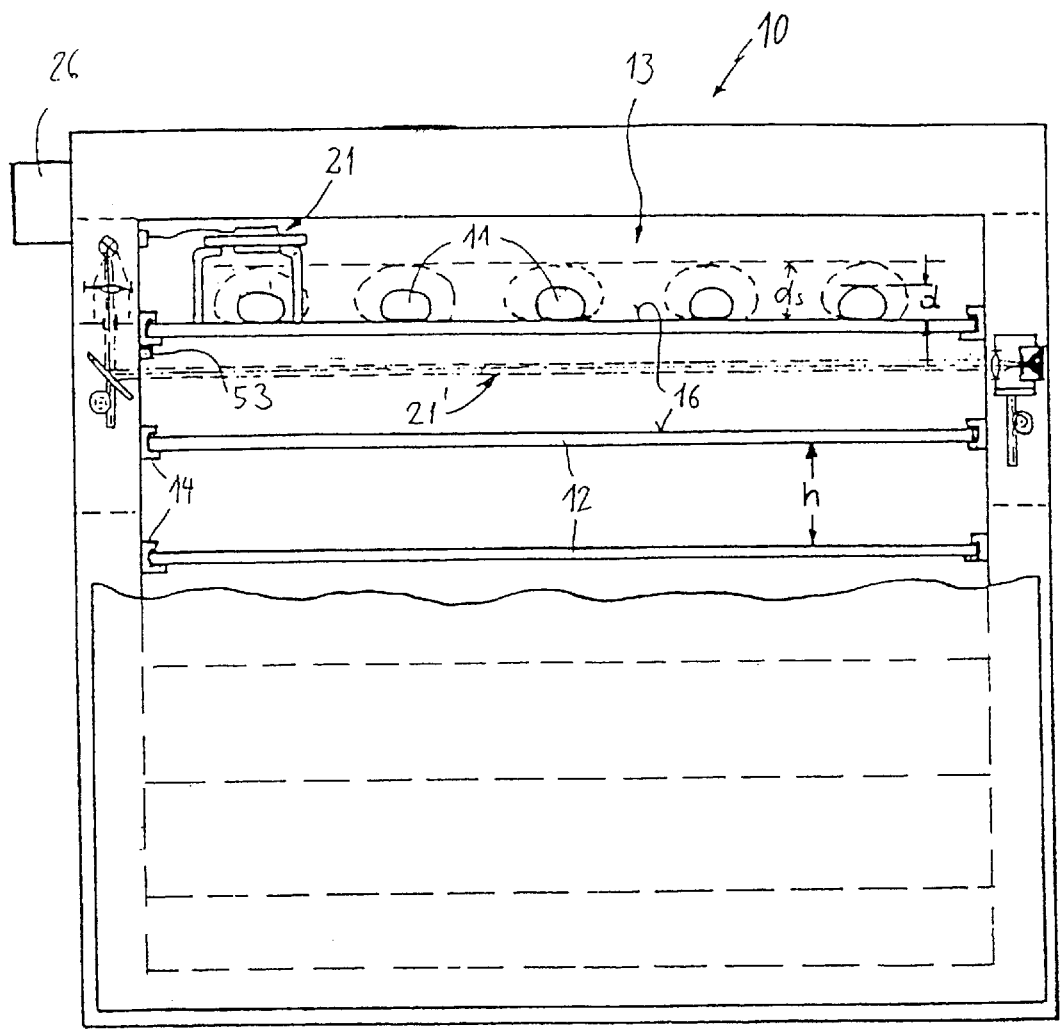
FIG. 1 a schematic simplified step diagram of a proofing cabinet, which is outfitted with an inventive distance measuring device.

In the proofing chambers indicated overall with reference number 10 in FIG. 1 there are dough lumps 11, for example for table rolls, which can be subjected to a proofing process, before they can be finally baked in a baking oven (not shown) immediately after completion of the proofing process.

By means of this proofing process the dough lumps 11, which undergo a substantial increase in volume during the proofing process, are to be brought to the suitable consistency of the dough for baking, which brings about once again further volume increase up to the final size of the finished rolls.

Herein the dough lumps 11 rest on proofing sheets 12, which are easily slideable in the sideways guide rails 14, which facilitates the easy introduction of the dough lumps into the proofing chamber 13 of the proofing cabinet and the removal thereof. These proofing sheets 12 which have an approximately square carrying surface 16 are provided respectively in the same spatial separation h from each other, which for the purposes of explanation will be presumed herein to be approximately 70 mm, wherein it is presumed that the intended thickness $d_s$ of the dough lumps 11 as a result of the proofing process, is to have a vertical final thickness of approximately 50 mm. In the design presumed for the proofing cabinet 10 used in this explanation, 6 proofing sheets 12 are provided, on which batches of respectively 25 dough lumps 11 can be deposited.

The proofing cabinet 10 is provided with a hot air convection heating device (not shown), by means of which the temperature produced in the proofing chamber 13 is adjustable and can be changed or varied to conform to a product-optimal temperature curve, over which the proofing process is controllable, wherein various temperature curves can be pre-selected and be run by control programs.

For monitoring the proofing process, which results in an increase in volume of the dough lumps, a distance sensor indicated overall with 21 is provided, by means of which the vertical thickness d in the central area of a selected dough lump 11 is determinable, which is monitored as criteria for the degree of ripeness of the dough lumps 11 subjected to the proofing process. As soon as the dough lump has achieved the pre-determined intended thickness $d_s$, the distance sensor 21 produces an electrical output signal characteristic therefore, which serves as an indicator signal signifying that the dough lumps have achieved their condition of readiness for baking and, on the other hand, as control signal for reducing the temperature in the proofing chamber 13, in order to stop the proofing process.

Figure 2A:
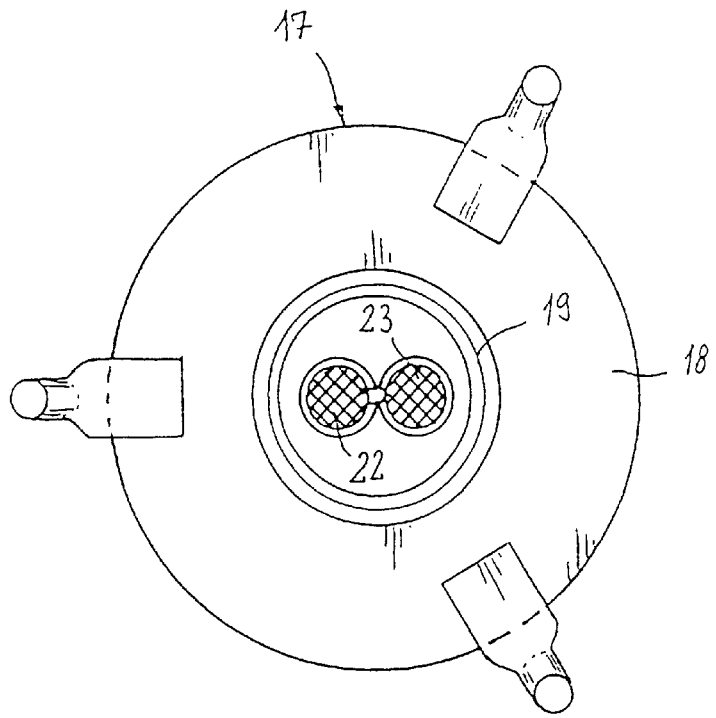
FIG. 2a and 2b a suitable ultrasonic type distance sensor for use in a proofing chamber according to FIG. 1.
Figure 2B:
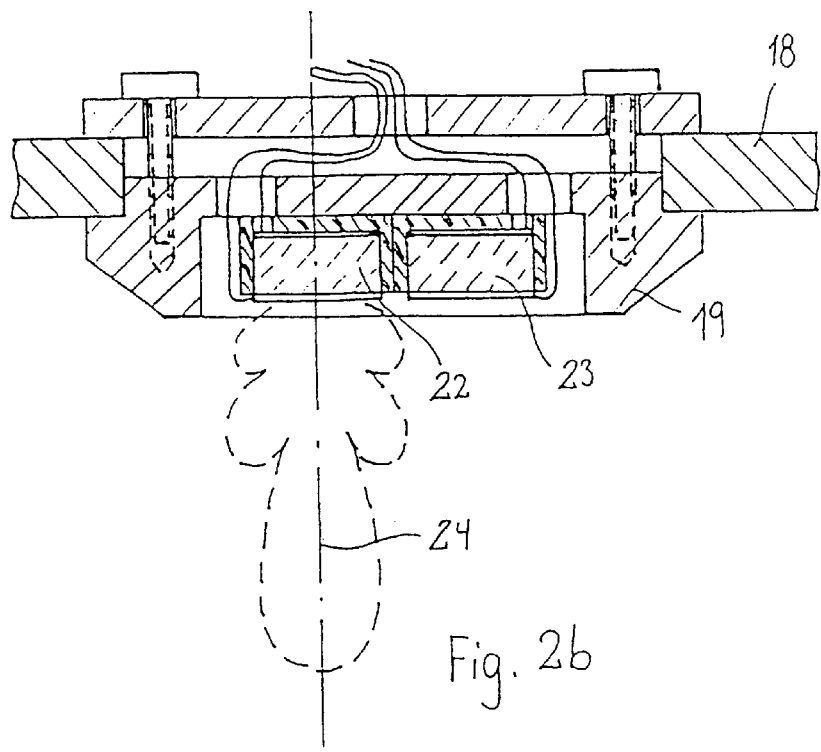

This distance sensor 21, now explained in greater detail by reference to FIG. 2a and 2b, is in constructed the represented special exemplary embodiment as an ultrasonic sensor, which is mounted on a carrying framework 17 in the manner of a three legged round table in the central area of the "table top" 18. The ultrasonic sensor includes an ultrasonic transmitter 22 seated in a flat cell 19, which is seated in a central borehole of the table top 18, and an immediately adjacent ultrasonic receiver 23, wherein the ultrasonic sensor 22 is so constructed and arranged, that the central axis 24 of its lobe-shaped emission field indicated with dashed lines in FIG. 2b is directed vertically downwards, when the distance sensor 21 with its three leg design 17 is seated upon the proofing sheet 12 carrying the dough lump 11 to be monitored. The receiver 23 is so designed and positioned, that it can receive "direct" ultrasonic transmission emitted slightly sideways from the emitter and reflected from the dough lump 11, so that a measurement of the distance of a central area of the upper surface of the dough lump 11 from the ultrasonic emitter 22, and therewith the known separation of the ultrasonic sender 22 from the carrying surface 16 of its framework 17, and also the thickness of the dough lump 11, can be determined in the following manner:

If the emitter 22 is caused to emit ultrasound, then there occurs immediately thereafter in response to the direct emission received "along the shortest path", which is radiated out sideways, a starting signal of the receiver 23, which initiates the activation of a timing pulse counter (not shown), which counts the number of counting pulses produced for example with the frequency of 1 MHz, until the ultrasonic radiation reflected following reception by the measuring object, the dough lump 11, produces in the receiver a higher level then the starting signal, the occurrence of which terminates the timing pulse counting. The count of the time counter is then a very precise measurement representing the travel time of the ultrasonic radiation from emitter 22 to dough lump 11 and from this to the receiver 23, and can be converted by a measurement operation driving, essentially schematically indicated, electronic control unit 26 into the thickness d of the dough lump. In this mode of operation of the distance sensor 21, which can be calibrated in simple manner by making a reference measurement without a dough lump 11, that is, measurement of the distance from the sensor 21 to the proofing sheet 16, the measurement of the thickness of the dough lump with a precision of 0.3 to 0.5 mm is easily achieved, which is sufficient for monitoring the thickness of the dough lumps. By means of a time-wise repetition of such a measuring cycle, for example in time intervals of 10 to 20 seconds, a quasi continuous monitoring of the proofing process is possible, so that based on the value of the continuously determined values of the thickness of the dough lump 11 the process control can be influenced— "corrected"—by means of the electronic control unit 26 in such a manner, for example by temperature changes in the proofing chamber 13, so that the proofing process after the expiration of the defined process time results in the desired degree of ripeness overall of the dough lumps 11.

As already mentioned, the distance sensor 21 which can be introduced into the proofing cabinet 10 is suitable in particular for a retrofitting of existing proofing cabinets, for which it is essentially only necessary to provide electrical lines for the supply of electricity for the distance sensor and for relaying signals to the electronic control unit 26. It is also understood that a distance sensor 21 of the above mentioned type can be permanently installed as a measuring device as original equipment in a proofing cabinet 10.

Figure 3:
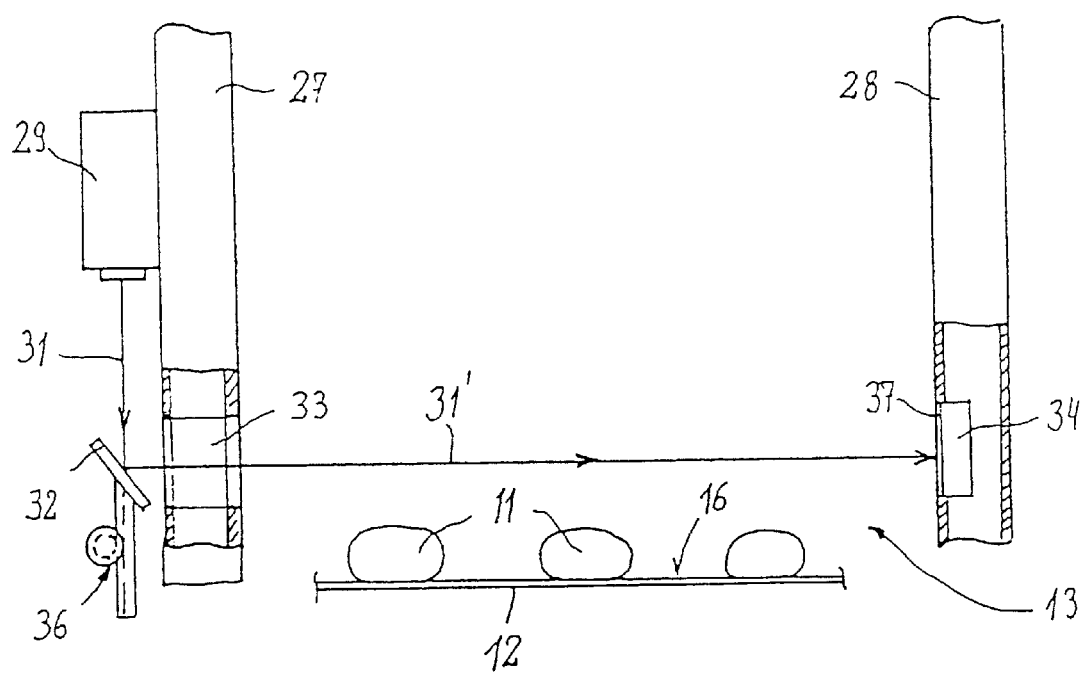
FIG. 3 a schematic simplified representation of the light interruption device, which can be used as measuring device in the proofing chamber according to FIG. 1.
Figure 4:
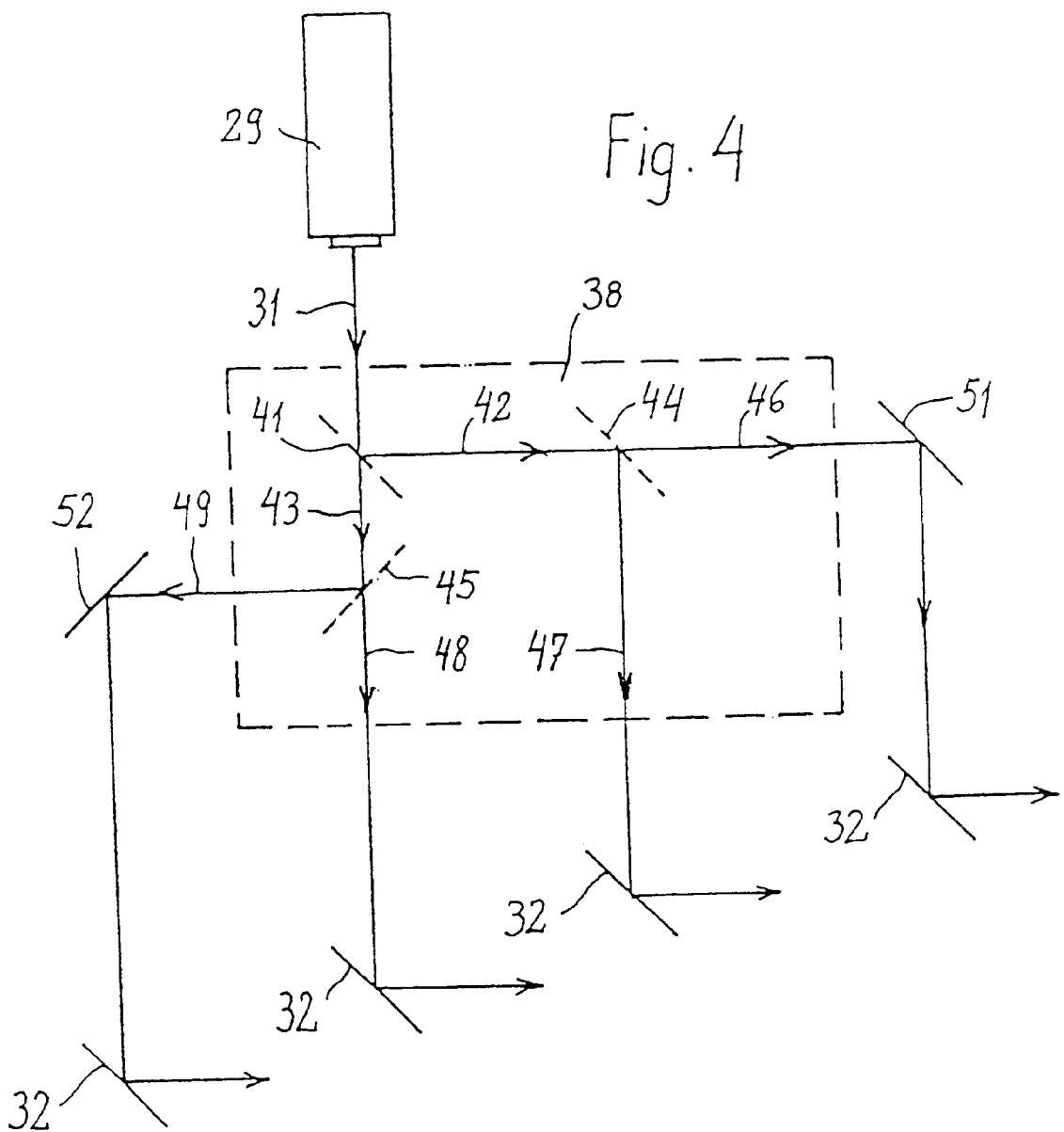
FIG. 4 a schematic representation of a beam splitter device, by means of which the output light beam of a laser can be distributed to plurality of light interruption devices.

In an alternative design to the ultrasonic sensor, which is suitable in particular for a permanent installation in a proofing cabinet 10, the distance sensor is a light interruption device 21' indicated essentially schematically in FIG. 1, for the explanation of the details of which reference can be made to the discussion of FIGS. 3 and 4.

In the light detector device 21 a laser 29 is provided as light source, for example on the outside of the two parallel vertical cabinet walls, which produces a tightly bundled parallel light beam of small cross section and relative high light intensity, represented essentially by a central beam 31, which is emitted in the vertical direction out of the laser 29. This light beam 31 is redirected about 90° by means of a deflection mirror 32 in order to produce the cabinet light beam 31' necessary for the light detector device and channeled into the proofing chamber 13 via a window 33 provided in the cabinet wall, as shown in the representation according to FIG. 3 in the left cabinet wall 27, so that it passes over multiple dough lumps 11, which are provided on the proofing sheet 12, in defined separation therefrom and impinges on detector device 34 positioned on the opposite cabinet wall 28, essentially schematically indicated, which produces an output signal of defined level, as long as the cabinet light beam 31' is not interrupted.

In order to be able to adjust the vertical separation of the cabinet light beam 31' from the support surface 16 of the proofing sheet, which carries the dough lumps 11 being monitored, and thereby to be able to select the size to which these dough lumps 11 should be allowed to be rise, the deflection mirror 32 via which the cabinet light beam 31' is channeled into the proofing chamber 13, is designed to be height-adjustable by means of a schematically indicated rack and pinion drive 36. In accordance therewith the entry window 33 for the cabinet light beam 31' is preferably formed to have a narrow slit shape, so that it extends over the possible adjustment range of the deflection mirror and herein the detector device 34 is adapted thereto in such a manner that its light sensitive receiver surface 37 likewise extends over the possible adjustment range of the cabinet light beam 31'.

In order to be able to utilize a laser 29, which is capable of producing a relatively high light output, as light source for a multiplicity of dough lumps 11 when monitoring the proofing process of dough lumps 11, which in certain cases can be provided in various proofing cabinets which are positioned with fixed 30 spatial correlation to each other within a larger facility, the beam splitter device shown overall with reference number 38 in FIG. 4 can be used, by means of which the primary output light beam 31 of the laser 29 can be divided into four chamber light beams of approximately the same intensity, which via a height adjustable deflection mirror 32 can be channeled into the respective proofing cabinets.

The primary output light beam 31 produced by the laser 29 impinges on a first half-silvered or partially transmissive mirror serving as a beam splitter 41 and is divided thereby into an—according to the representation in FIG. 4—right angled redirected reflected partial light beam 42 and a transmitted partial light beam 43, wherein these two light beams 42 and 43 have the same intensity. The partial light beam 42 reflected by the first beam splitter 41 impinges on a second beam splitter 44 designed as partially transmissive deflection mirror and is divided thereby into a transmitted partial light beam 46 and a reflected partial light beam 47, which again have the same intensity. The partial light beam 43 which passes through the first beam splitter 41 impinges upon a third beam splitter 45 designed as partially transmissive deflection mirror and is there divided into a transmitted partial light beam 48 and a reflected partial light beam 49 of respectively the same intensity.

The four partial light beams 46 through 49 of same intensity can be used for forming light interruption detector devices 21 in the manner shown in FIG. 3 in four different proofing chambers.

For the laser 29 in the "vertical" arrangement thereof as shown in FIG. 3, that is the vertical emission direction of its primary light beam 31, the emitted light beam 48 and the thereto parallel emitted light beam 47 traveling in the direction of the optical axis of the laser 29 can, by employment of respectively one height adjustable mirror 32, be used directly for formation of a height adjustable light detector device 21 (FIG. 2). For the two other output light beams 46 and 49 there is required, for the indicated purpose, also respectively one 90° deflection mirror 51 or as the case may be 52.

A useful arrangement of the light interruption detection device can also be comprised therein, that a scatter light sensor 52 is provided shown essentially in schematic manner in FIG. 1, which is provided above the first dough lump, upon which the chamber light beam of the respective light detectors can impinge, and, as soon as this dough lump reaches the light beam, part of this scatter light reaches the detector and thereby is caused to produce an electrical indicator signal.

What is claimed is:

1. A device for detecting the proofing condition of lumps of dough (11) during a proofing process in a proofing chamber (13), in the course of which the lumps of dough experience an increase in volume, comprising:

a proofing chamber (13) including at lest one surface (16) for receiving lumps of dough;

a distance sensor (21) provided in the proofing chamber (13) and positioned for monitoring a lump of dough (11);

means associated with said distance sensor for producing an output signal when said distance sensor determines that a lump of dough (11) has achieved a predetermined intended thickness value, which is correlated with a desired degree of ripeness of the lump of dough.

2. A device according to claim 1, wherein the distance sensor (21) detects the height d of the lump of dough (11) above said surface (16).

3. A device according to claim 2, wherein said distance sensor (21) is an ultrasonic sensor, which operates based on the principle of the travel time of a sound signal.

4. A device according to claim 1, wherein the proofing chamber includes at least one proofing sheet (12), and wherein the distance sensor (21) is provided on a framework (17) employable in the proofing chamber (13), and adapted for being placed on a surface (16) of the proofing sheet (12) when in the chamber (13).

5. A device according to claim 4, wherein said framework (17) is a three-legged framework.

6. A device according to claim 1, wherein said at least one lump of dough has a central area, and wherein the distance sensor (21') is a light interruption detector for detecting interruption of a light beam (31') passing above the central area of at least one lump of dough (11) in the proofing chamber (13).

7. A device according to claim 6, wherein the height of the light beam (31') in the proofing chamber (13) above the surface (12) carrying the one or more respective lumps of dough (11) to be monitored is adjustable.

8. A device according to claim 6, wherein the light interruption detector is arranged in the proofing chamber so that the light beam (31') is able to cross over a multiplicity of lumps of dough (11).

9. A device according to claim 6, wherein said light beam is a laser beam (29).

10. A device according to claim 9, wherein a beam splitter device (38) is provided, which divides the output light beam of the laser (28) into multiple partial light beams (46, 47, 48, 49), which can be utilized for monitoring the proofing condition of the lumps of dough (11), which are subjected to the proofing process provided on different surfaces of a proofing chamber or in different proofing chambers.

11. A device according to claim 10, wherein at least one scatter light detector (53) is provided for detecting scatter light.

12. A device according to claim 11, wherein said scatter light detector (53) is positioned above a sensing plane defined by the light beam.

* * * * *